United States Patent [19]

Maeda et al.

[11] Patent Number: 5,499,825
[45] Date of Patent: Mar. 19, 1996

[54] SPHERICAL ANNULAR SEAL

[75] Inventors: Takashi Maeda, Fujisawa; Shuichi Kubota, Yokohama; Takeshi Furukido; Toshiyuki Nishio, both of Yamato, all of Japan

[73] Assignee: Oiles Corporation, Tokyo, Japan

[21] Appl. No.: 465,744

[22] Filed: Jun. 6, 1995

Related U.S. Application Data

[63] Continuation of Ser. No. 130,198, Oct. 1, 1993, abandoned.

[30] Foreign Application Priority Data

Oct. 12, 1992 [JP] Japan .................................. 4-300551

[51] Int. Cl.⁶ ....................................... F16J 15/12
[52] U.S. Cl. ..................... 277/100; 277/227; 277/229; 277/235 R; 428/609
[58] Field of Search ............................. 277/DIG. 6, 100, 277/227, 229, 230, 231, 232, 233, 235 R, 235 A, 204; 428/609

[56] References Cited

U.S. PATENT DOCUMENTS

| | | |
|---|---|---|
| 4,209,177 | 6/1980 | Hall . |
| 4,417,733 | 11/1983 | Usher . |
| 4,462,603 | 7/1984 | Usher et al. ............................. 277/230 |
| 4,547,434 | 10/1985 | Sumiyoshi et al. . |
| 4,551,393 | 11/1985 | Sumiyoshi et al. . |
| 4,559,248 | 12/1985 | Sumiyoshi et al. . |
| 4,559,249 | 12/1985 | Arigaya et al. . |
| 4,607,851 | 8/1986 | Usher . |
| 4,762,330 | 8/1988 | Lonne et al. . |
| 4,871,181 | 10/1989 | Usher et al. ............................ 277/229 |
| 4,902,024 | 2/1990 | Takenoshita . |
| 4,951,954 | 8/1990 | MacNeill ................................ 277/229 |
| 5,040,805 | 8/1991 | Ozora . |
| 5,065,493 | 11/1991 | Ozara ...................................... 277/229 |

FOREIGN PATENT DOCUMENTS

| | | |
|---|---|---|
| 0453068A2 | 10/1991 | European Pat. Off. . |
| 58-34230 | 2/1983 | Japan . |
| 58-24620 | 2/1983 | Japan . |

*Primary Examiner*—Daniel G. DePumpo
*Attorney, Agent, or Firm*—Nixon & Vanderhye

[57] ABSTRACT

A spherical annular seal having a through hole in a center thereof and a partially convex spherical surface portion on an outer surface thereof, wherein a surface of the partially convex spherical surface portion is formed into a smooth surface in which a lubricating sliding layer of a lubricating composition containing 70 to 90 wt. % of boron nitride and 10 to 30 wt. % of alumina and/or silica and a reinforcing material constituted by a metal wire net covering the lubricating sliding layer and integrated with the lubricating sliding layer are integrated in mixed form.

5 Claims, 5 Drawing Sheets

SPHERICAL ANNULAR SEAL

This is a continuation of application Ser. No. 08/130,198, filed Oct. 1, 1993, now abandoned.

BACKGROUND OF THE INVENTION

The present invention relates to a spherical annular seal used in a spherical pipe joint for an automobile exhaust pipe.

Conventionally, as a spherical annular seal used in a spherical pipe joint for an automobile exhaust pipe, one disclosed in, for instance, U.S. Pat. No. 4,607,851 (hereafter referred to as the prior art publication I) is known.

The seal disclosed in this prior art publication I is heat resistant, excels in affinity with a mating member, and has remarkably improved impact strength, but has a drawback in that the seal often generates abnormal noise when it undergoes friction under dry frictional conditions.

The drawback of this seal is conceivably attributable to a large difference between the coefficient of static friction and the coefficient of dynamic friction of a heat resistant material, such as expanded graphite, for forming the seal, and to a phenomenon in which the seal formed of the heat resistant material shows, in the frictional resistance characteristic to the sliding velocity, negative resistance in which an increase in the sliding velocity results in a decline in the frictional resistance.

Accordingly, a seal which overcomes the above-described drawback has been proposed in Japanese Patent Unexamined Publication No. 24620/1983 (hereafter referred to as the prior art publication II).

This prior art publication II discloses a seal in which a heat resistant material formed of one kind selected from expanded graphite, mica, and asbestos or a mixture of two or more kinds selected therefrom is shaped with a reinforcing material formed of a metal wire net obtained by weaving or knitting fine metal wires, the surface of the seal being coated with a lubricating composition formed of polytetrafluoroethylene or a tetrafluoroethylene-hexafluoropropylene copolymer.

With this seal, the lubricating composition coated on the surface exhibits operational advantages such as a decrease in the coefficient of friction, the prevention of transfer of the heat resistant material forming a base onto the surface of the mating member, and a reduction of the difference between the coefficient of static friction and the coefficient of dynamic coefficient. In addition, since the frictional resistance of polytetrafluoroethylene relative to the sliding velocity does not show negative resistance, this sealing member has an advantage in that it is possible to suppress the generation of self-excited vibrations based on the "stick slip" in association with the above-described effects, thereby contributing to the prevention of the generation of abnormal noise.

Although the seal disclosed in the prior art publication II described above overcomes the drawback of the seal disclosed in the above-described prior art publication I in terms of the performance, the ambient temperature to which the seal disclosed in the prior art publication II is applicable is determined by the heat resistance of the lubricating composition coated on the surface. Hence, there is a problem in that the seal is inevitably restricted to use in the ambient temperature of not more than 300° C. Additionally, the following new problem arises.

That is, there occurs a phenomenon in which, in a case where the seal is used by being incorporated in a spherical pipe joint for an automobile exhaust pipe, the lubricating composition coated on the surface of the seal becomes fused due to the action of heat from exhaust gases flowing through the exhaust pipe, and the fused lubricating composition fixedly adheres to the surface of the mating member when the exhaust pipe is cooled after the stopping of an engine, thereby hampering the relative angular displacement of the spherical pipe joint.

It has been experimentally confirmed that such a phenomenon occurs noticeably when the seal is used particularly under such a temperature condition of the exhaust pipe that the lubricating composition formed on the surface of the seal is fused, and when the seal is applied to a portion where a relative angular displacement applied to the pipe joint is small.

Accordingly, if such a phenomenon of fixed adhesion occurs, it is not only difficult to attain the original object of the pipe joint, but also there arises a problem in that, if a large angular displacement is applied to the pipe joint after the restarting of the engine, large abnormal noise is generated due to the overcoming of the phenomenon of fixed adhesion.

SUMMARY OF THE INVENTION

The present invention has been accomplished in view of the above-described problems, and an object of the present invention is to provide a seal which is capable of being used in an ambient temperature ranging widely from a normal temperature (20° C.) to 500° C., of avoiding the phenomenon of fixed adhesion of a lubricating sliding layer, formed of a lubricating composition on the surface of the seal, onto a mating member due to the action of heat from exhaust gases, and of obtaining a lubricating sliding layer excelling in the retainability on the surface of the seal, thereby making it possible to prevent the occurrence of a decline in a sliding characteristic and abnormal noise not only during an initial period but over long periods of use.

In accordance with the present invention, the above-object is attained by a spherical annular seal particularly used for an exhaust pipe joint, comprising a compression-formed piece obtained by compressing a reinforcing material, including a metal wire net obtained by weaving or knitting fine metal wires, and a heat resistant material, including expanded graphite, mica, or asbestos, the spherical annular seal having a through hole in a center thereof and a partially convex spherical surface portion on an outer surface thereof, wherein a surface of the partially convex spherical surface portion is formed into a smooth surface in which a lubricating sliding layer of a lubricating composition containing 70 to 90 wt. % of boron nitride and 10 to 30 wt. % of alumina and/or silica and a reinforcing material including a metal wire net covering the lubricating sliding layer and integrated with the lubricating sliding layer are integrated in mixed form.

In addition, another lubricating composition forming the lubricating sliding layer may contain 100 parts by weight of the lubricating composition containing 70 to 90 wt. % of boron nitride and 10 to 30 wt. % of alumina and/or silica, and may further contain polytetrafluoroethylene in a proportion of not more than 200 parts by weight, preferably in a proportion ranging from 50 to 150 parts by weight.

In the spherical annular seal in accordance with the present invention, a smooth surface in which a lubricating sliding layer of a lubricating composition constituted by boron nitride and alumina and/or silica, or a lubricating sliding layer of a lubricating composition constituted by boron nitride, alumina and/or silica, and polytetrafluoroethylene, and a reinforcing material formed of a metal wire net are present in mixed form is formed on the surface of the partially convex spherical surface portion as a frictional surface with respect to a mating member. Accordingly, relative angular displacements of upstream- and downstream-side exhaust pipes are allowed through a low frictional torque in friction with the mating member in a wide range from a normal temperature to 500° C.

In addition, in the spherical annular seal in which polytetrafluoroethylene is compounded in the lubricating composition forming the lubricating sliding layer, the fusion and softening of the lubricating sliding layer due to a rise in the ambient temperature and the fixed adhesion of the lubricating sliding layer on the surface of the mating member due to that fusion and softening, which is a problem of the prior art, does not occur for the following reasons, among others: Boron nitride and alumina or silica contained in the lubricating composition apparently increases the fusing and softening temperature of polytetrafluoroethylene; the retainability of the lubricating sliding layer on the partially convex spherical surface is enhanced by the action of alumina or silica; and continuous and direct contact of the lubricating sliding layer with the mating member is prevented since the lubricating sliding layer is mixed with the reinforcing material formed of a metal wire net.

Hereafter, a detailed description of the present invention will be given of an embodiment of the spherical annular seal, specific examples of component materials of the spherical annular seal and a method of manufacturing the seal with reference to the accompanying drawings. It should be noted that the present invention is not restricted to these specific examples.

DESCRIPTION OF THE PREFERRED EMBODIMENT

Reinforcing Material

As a reinforcing material for the spherical annular seal in accordance with the present invention, a metal wire net (metal mesh) is used which is formed by weaving or knitting, as an iron-based wire, a stainless steel wire made for example, of austenitic stainless steels SUS 304 (corresponding to ASTM A167 type 304, BS 304-S31 and NFZ 6CN, respectively) and SUS 316 (corresponding to ASTM A167 type 316, BS 316-S31 and NFZ 6CND, respectively), a ferritic stainless steel SUS 430 (corresponding to ASTM A167 type 430, BS 430-S17 and NFZ 8C17, respectively), or an iron wire or a galvanized iron wire (JIS-G-3532 corresponding to ASTM 510 and ASTM A-641 and BS 1052, respectively), or, as a copper wire, a wire member made of a copper-nickel alloy (cupro-nickel), a copper-nickel-zinc alloy (nickel silver), brass, or beryllium copper.

As the wire diameter of the fine metal wire forming the metal wire net, a fine metal wire having a diameter of 0.10 to 0.32 mm or thereabouts is used, and a metal wire net whose openings between adjacent wires or meshes are 3 to 6 mm or thereabouts is suitably used.

Heat Resistant Material

As a heat resistant material, expanded graphite, mica, or asbestos is selectively used. As the expanded graphite, a sheet-like material having a thickness of 0.3 to 1.0 mm, such as "Grafoil (trade name)" made by Union Carbide Corporation of the United States disclosed in U.S. Pat. No. 3,404,061 or "Nicafilm (trade name)" made by Nippon Carbon Co., Ltd., is suitably used.

As mica, mica paper in which mica is joined by means of a silicone resin is used, and, as asbestos, asbestos paper or an asbestos sheet of chrysotile or amosite is used.

Lubricating Composition

As a lubricating composition, an aqueous dispersion containing as a solid content 20 to 50 wt. % of a lubricating composition containing 70 to 90 wt. % of boron nitride and 10 to 30 wt. % of alumina and/or silica is used. As an alternative lubricating composition, an aqueous dispersion may be used which contains as a solid content 20 to 50 wt. % of a lubricating composition in which a lubricating composition containing 70 to 90 wt. % of boron nitride and 10 to 30 wt. % of alumina and/or silica is set as 100 parts by weight, and which additionally contains polytetrafluoroethylene in the proportion of 200 parts by weight or less, preferably 50 to 150 parts by weight.

The above-described aqueous dispersion of the lubricating composition is coated on the surface of the sheet-like heat resistant material by means of brushing, spraying, or the like in the manufacturing method which will be described later. In a final compression process, the coating is spread into a uniform and very small thickness (10 to 300 μm) on the surface of a partially convex spherical portion of a spherical annular seal so as to form a lubricating sliding layer.

In coating, in a case where the solid content in the aqueous dispersion is 20 to 30 wt. % (water content of 70 to 80 wt. %), a lubricating sliding layer of a desired thickness can be formed by repeating the coating operation two to three times.

Boron nitride among the constituents demonstrates excellent lubricity particularly at high temperatures. However, boron nitride as a single constituent is inferior in its adhesion onto the surface of the aforementioned sheet-like heat resistant material, and, hence, in its adhesion onto the surface of the partially convex spherical portion of the seal in the final compression process. Consequently, boron nitride as a single constituent has a drawback in that it is easily exfoliated from the surface.

In the present invention, it was found that by compounding alumina and/or silica with boron nitride at a fixed ratio, the aforementioned drawback of boron nitride as a single constituent can be avoided, its adhesion onto the surface of the partially convex spherical portion of the seal in the final compression process can be improved substantially, and that the retention of the lubricating sliding layer, formed by the lubricating composition, on the surface of the partially convex spherical portion of the seal can be enhanced.

It was confirmed that the proportion in which alumina and/or silica is compounded with respect to boron nitride is determined from the viewpoint of improving adhesion without impairing the lubricity of boron nitride, and that a range of 10 to 30 wt. % is therefore preferable.

In the aforementioned lubricating composition in which the lubricating composition containing 70 to 90 wt. % of boron nitride and 10 to 30 wt. % of alumina and/or silica is set as 100 parts by weight, and which contains polytetrafluoroethylene at a fixed ratio, polytetrafluoroethylene itself has a low frictional property, and as it is compounded with the lubricating composition formed of boron nitride and alumina and/or silica, polytetrafluoroethylene exhibits the action of improving a low frictional property of the lubricating composition, the action of enhancing the ductility of the lubricating composition during compression forming, and the action of improving the adhesion of the lubricating composition.

The proportion in which polytetrafluoroethylene is compounded with respect to 100 parts by weight of the lubricating composition containing 70 to 90 wt. % of boron nitride and 10 to 30 wt. % of alumina and/or silica is 200 parts by weight or less, preferably in the range of 50 to 150 parts by weight.

If the compounding proportion of polytetrafluoroethylene exceeds 200 parts by weight, the proportion of the resin in the lubricating composition becomes too large, with the result that the drawback in the prior art publication II cannot be avoided. If the compounding proportion of polytetrafluoroethylene is in the range of 50 to 150 parts by weight, the aforementioned actions can be demonstrated most satisfactorily.

Boron nitride, alumina and/or silica for forming the aqueous dispersion as well as polytetrafluoroethylene which may be compounded therewith are preferably in the form of as fine powders as possible, and fine powders having average particle sizes of 10 µm or less, preferably 0.5 µm or less, are used.

Next, a description will be given of a method of manufacturing a spherical annular seal formed of the above-described constituent materials.

Figure 2:
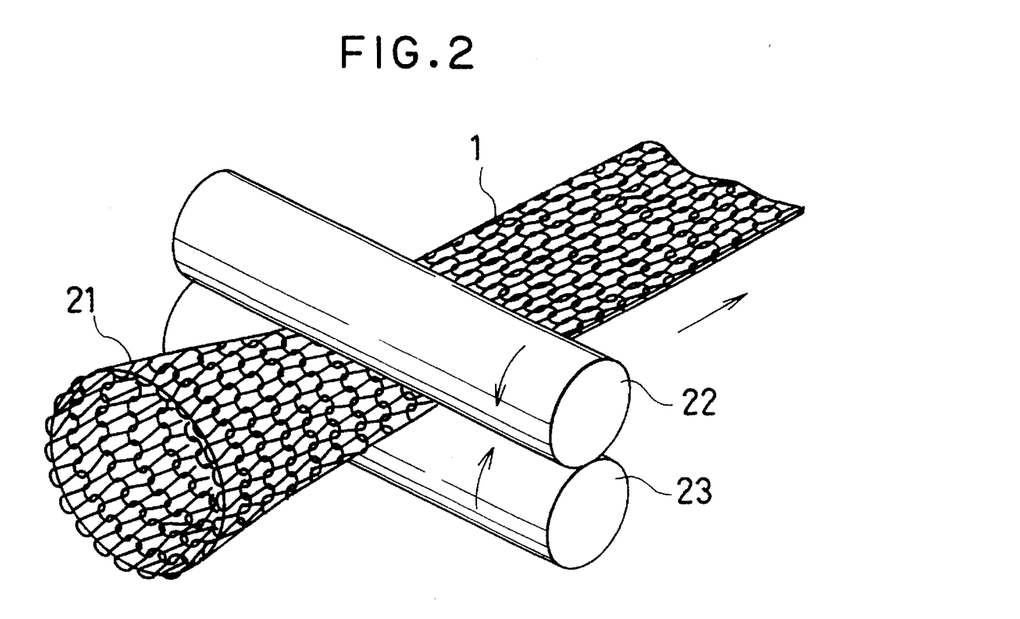
FIG. 2 is a perspective view illustrating a method of preparing a belt-shaped reinforcing material in a process of manufacturing the spherical annular seal in accordance with the present invention.

A belt-shaped metal wire net is prepared by cutting the metal wire net into a predetermined width, which is formed by weaving or knitting fine metal wires, or by allowing the cylindrical metal wire net 21, which is formed by weaving or knitting fine metal wires, to be passed between a pair of rollers 22 and 23 and is used as a reinforcing member 1.

Figure 3:
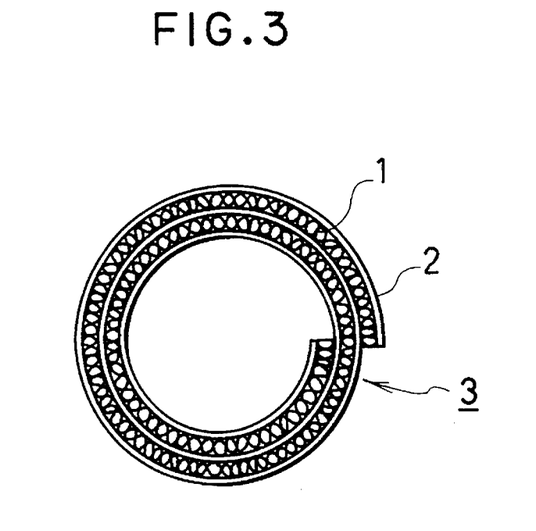
FIG. 3 is a plan view of a cylindrical member in the process of manufacturing the spherical annular seal in accordance with the present invention.

As the heat resistant material, a sheet-like heat resistant member 2 cut to a predetermined width is prepared. Then, as shown in FIG. 3, the reinforcing member 1 formed of the belt-shaped metal wire net and the sheet-like heat resistant member 2 are superposed one on top of the other, and the superposed assembly is convoluted into a cylindrical shape such that the sheet-like heat resistant member 2 is located on the inner periphery and also on the outermost periphery, thereby preparing a cylindrical member 3.

Figure 4:
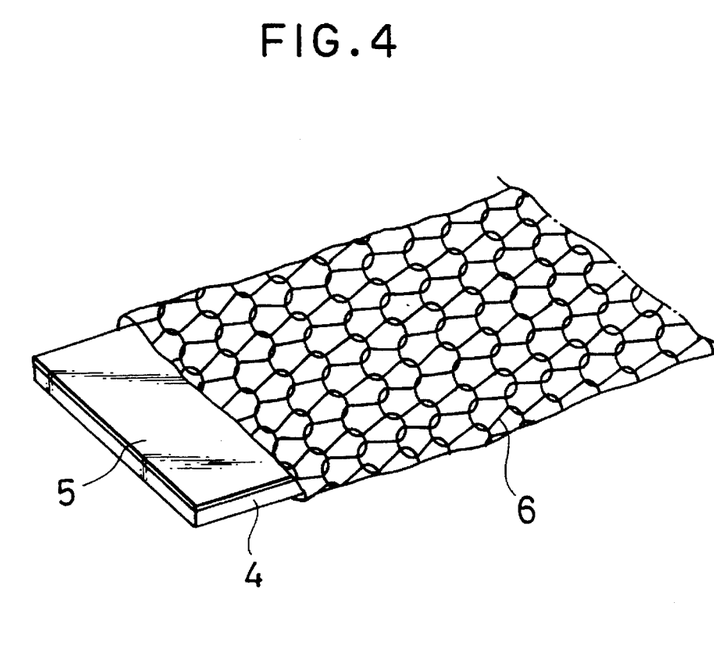
FIG. 4 is a perspective view of a sliding surface member in the process of manufacturing the spherical annular seal in accordance with the present invention.
Figure 5:
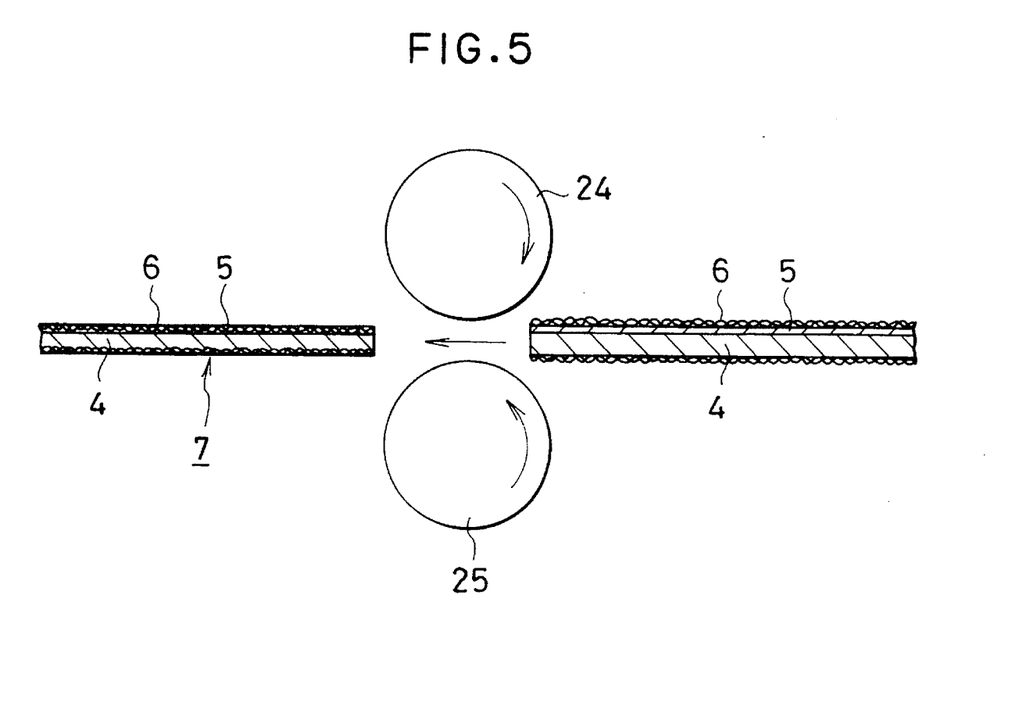
FIG. 5 is a vertical cross-sectional view of the sliding surface member in the process of manufacturing the spherical annular seal in accordance with the present invention.

As shown in FIG. 4, a sheet-like heat resistant member 4 similar to the sheet-like heat resistant member 2 is prepared separately. An aqueous dispersion containing as a solid content 20 to 50 wt. % of a lubricating composition containing 70 to 90 wt. % of boron nitride and 10 to 30 wt. % of alumina and/or silica, or an aqueous dispersion containing as a solid content 20 to 50 wt. % of a lubricating composition in which a lubricating composition containing 70 to 90 wt. % of boron nitride and 10 to 30 wt. % of alumina and/or silica is set as 100 parts by weight, and which additionally contains polytetrafluoroethylene in the proportion of 200 parts by weight or less, preferably 50 to 150 parts by weight, is applied to one surface of the sheet-like heat resistant member 4 by means of brushing, spraying, or the like, and is then dried to form a coating layer 5 of the lubricating composition. Meanwhile, after the fine metal wires are woven to form a cylindrical metal wire net, the cylindrical metal wire net is passed between a pair of rollers, thereby preparing a belt-shaped metal wire net 6. Then, as shown in FIG. 4, the sheet-like heat resistant member 4 having the coating layer 5 is inserted into the belt-shaped metal wire net 6, and, as shown in FIG. 5, an assembly thereof is passed between a pair of rollers 24 and 25 so as to be formed integrally, thereby preparing a sliding surface member 7.

Figure 6:
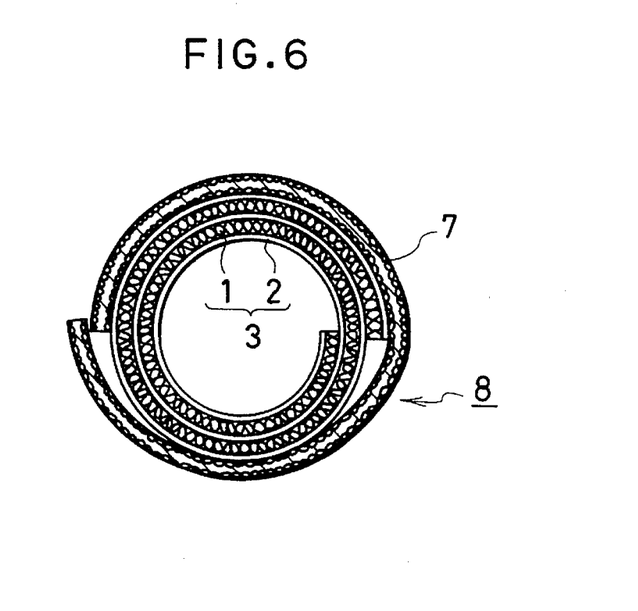
FIG. 6 is a plan view of a cylindrical preform in the process of manufacturing the spherical annular seal in accordance with the present invention.

The sliding surface member 7 thus obtained is wound around an outer peripheral surface of the aforementioned cylindrical member 3 with the coating layer 5 placed on the outer side, thereby preparing a cylindrical preform 8, as shown in FIG. 6.

Figure 7:
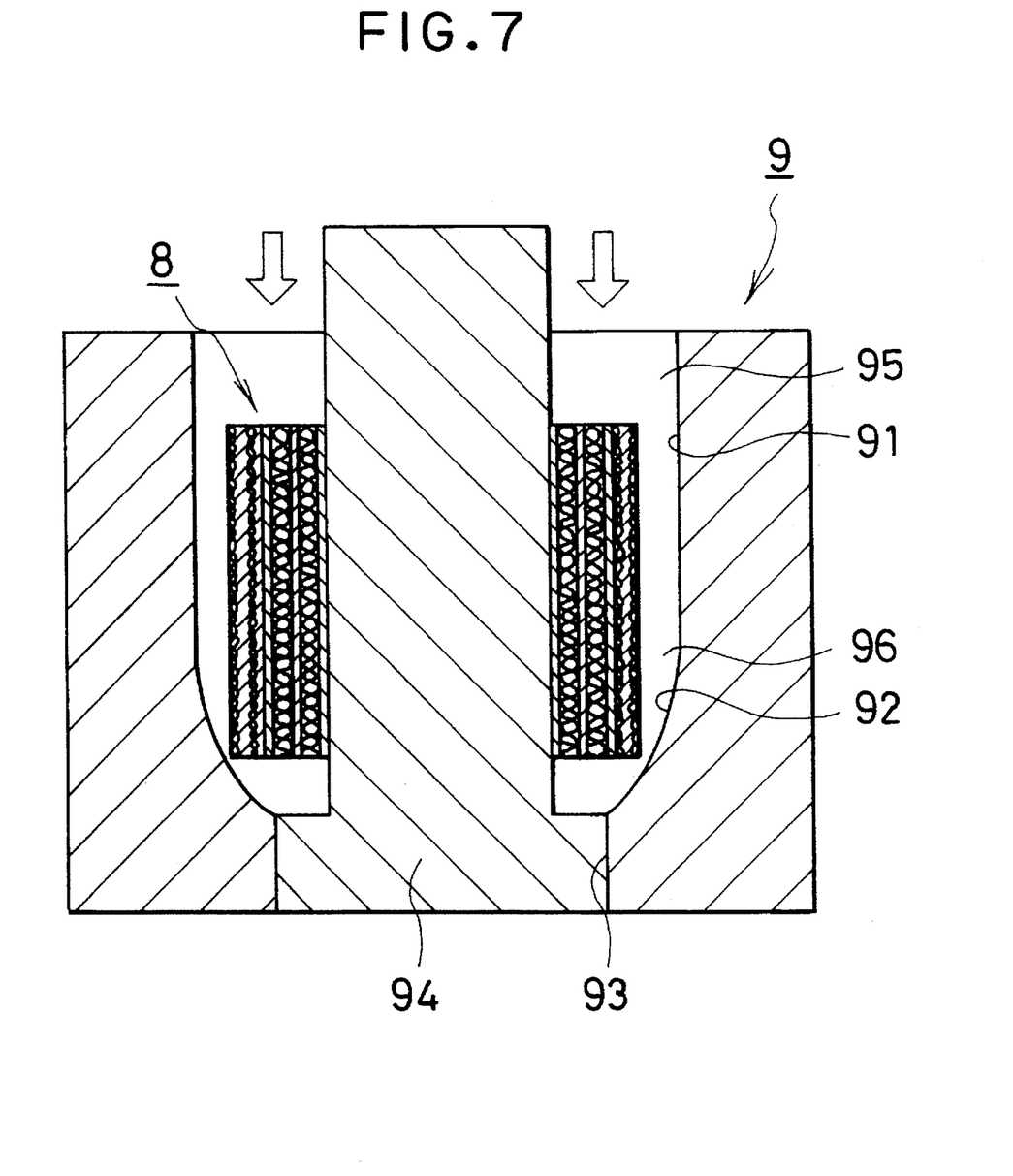
FIG. 7 is a vertical cross-sectional view illustrating a state in which the cylindrical preform is inserted in a die in the process of manufacturing the spherical annular seal in accordance with the present invention.

As shown in FIG. 7, a die 9 is prepared which has a cylindrical inner wall surface 91, a partially concave spherical inner wall surface 92 continuing from the cylindrical inner wall surface 91, and a through hole 93 continuing from the partially concave spherical inner wall surface 92, and in which a hollow cylindrical portion 95 and a spherical annular hollow portion 96 continuing from the hollow cylindrical portion 95 are formed inside it as a stepped core 94 is inserted in the through hole 93. Then, the cylindrical preform 8 is fitted over the stepped core 94 of the die 9.

Figure 1:
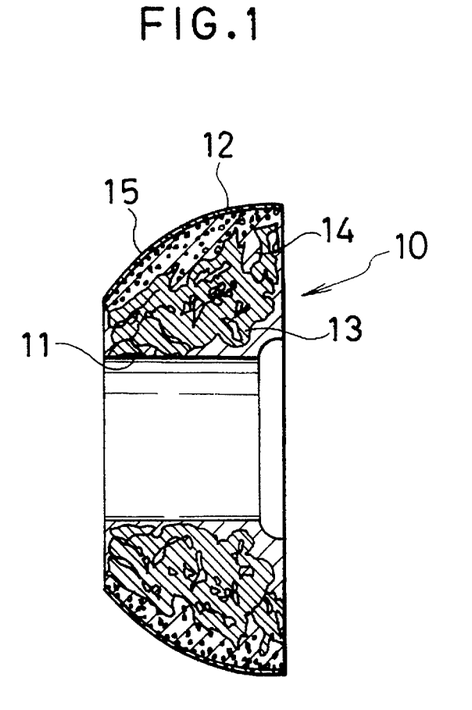
FIG. 1 is a vertical cross-sectional view of a spherical annular seal in accordance with the present invention.

The cylindrical preform 8 located in the hollow portion of the die 9 is subjected to compression forming under a pressure of 1 to 3 tons/cm$^2$ in the direction of the core axis. Thus, a spherical annular seal 10 having a through hole 11 in its center and a partially convex spherical surface portion 12 on its outer surface is produced, as shown in FIG. 1.

By means of this compression forming, the reinforcing member 1 constituted by the metal wire net and the heat resistant member 2 in the cylindrical member 3 are intertwined with each other and forms an integrated base of the seal. A smooth surface 15 in which the lubricating composition and the metal wire net of the sliding surface member 7, which has become integrated with the base, are integrated in mixed form is formed on the surface of the partially convex spherical surface portion 12 of the base. In FIG. 1, reference numeral 13 denotes a reinforcing material formed of the metal wire net forming the base of the seal, and numeral 14 denotes the heat resistant member integrated with the reinforcing member. The smooth surface 15 thus formed is such that the metal wire net and the lubricating sliding layer formed of the lubricating composition, which are formed by the sliding surface member 7, are integrated in mixed form.

Figure 8:
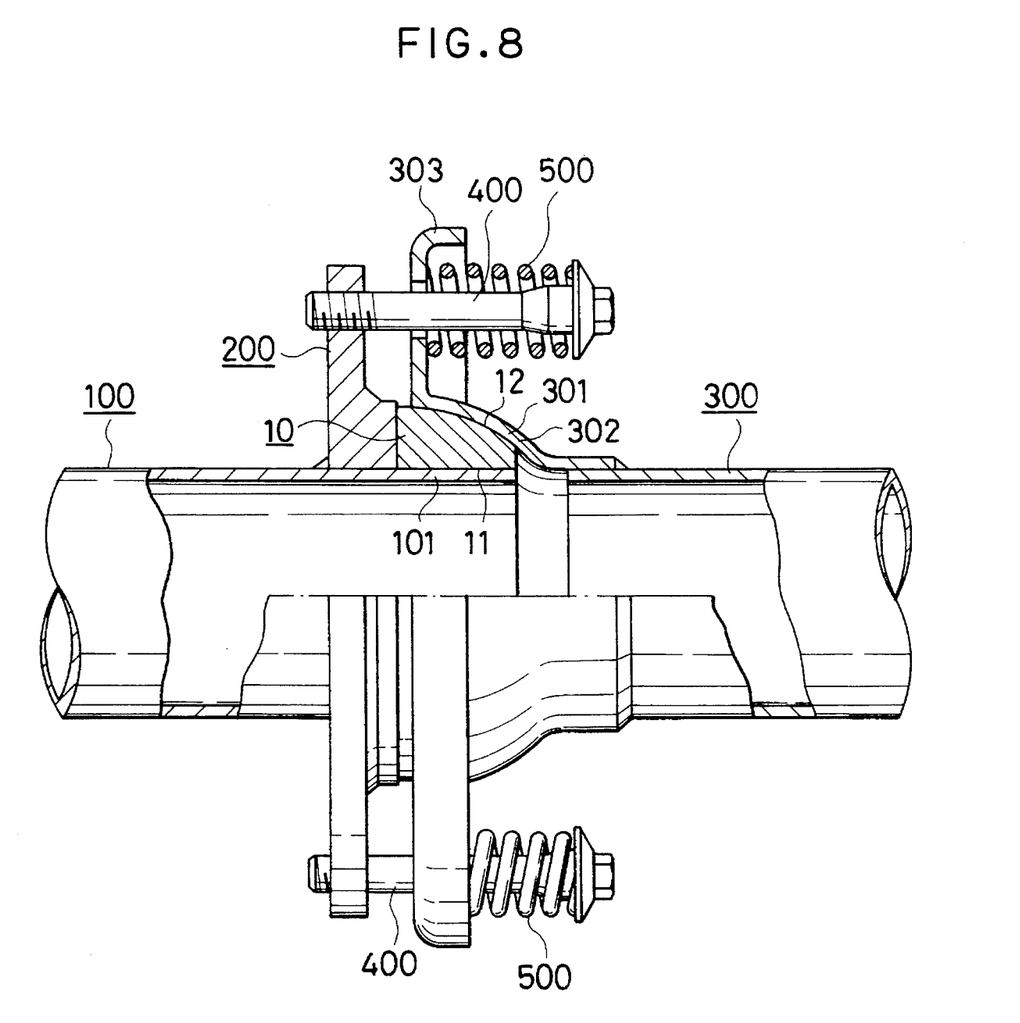
FIG. 8 is a vertical cross-sectional view of an exhaust pipe joint incorporating the spherical annular seal in accordance with the present invention.

The spherical annular seal 10 constructed as described above is used by being incorporated in the exhaust pipe joint shown in FIG. 8.

That is, a flange 200 is provided uprightly on an outer peripheral surface of an upstream-side exhaust pipe 100, which is connected to an engine, with a pipe end 101 projecting from the flange 200 in the longitudinal direction of the exhaust pipe 100. The spherical annular seal 10 is fitted over the pipe end 101 at the through hole 11, and is seated with a large-diameter-side end face of the partially convex spherical surface portion 12 abutting against that flange 200.

A downstream-side exhaust pipe 300 opposes at one end the upstream-side exhaust pipe 100 and is connected at the other end to a muffler. A flared portion 301, which is comprised of a concave spherical surface portion 302 and a flange portion 303 provided at a rim of an opening portion of the concave spherical surface portion 302, is formed integrally at one end of the downstream-side exhaust pipe 300. The exhaust pipe 300 is disposed with the concave spherical surface portion 302 slidingly abutting against the partially convex spherical surface portion 12 of the spherical annular seal 10.

The downstream-side exhaust pipe 300 is constantly urged toward the upstream-side exhaust pipe 100 by means of a pair of bolts 400 each having one end fixed to, the flange 200 and another end arranged by being inserted in the flange portion 303 of the flared portion 301, and by means of a pair of coil springs 500 each arranged between a head of the bolt 400 and the flange portion 303.

The arrangement provided is such that relative angular displacements occurring in the upstream- and downstream-side exhaust pipes 100 and 300 are allowed by sliding contact between the partially convex spherical surface portion 12 of the spherical annular seal 10 and the concave spherical surface portion 302 of the flared portion 301 formed at the end of the downstream-side exhaust pipe 300.

Hereafter, a detailed description will be given of examples of the spherical annular seal in accordance with the present invention.

EXAMPLE I

By using an austenitic stainless steel wire (SUS 304) having a wire diameter of 0.28 mm as the fine metal wire, a cylindrical woven metal wire net whose meshes were 3 mm was prepared, and was passed between a pair of rollers to form a belt-shaped metal wire net. The metal wire net thus formed was used as the reinforcing member 1.

As the heat resistant member 2, sheet-like expanded graphite ("Nicafilm (trade name)" made by Nippon Carbon Co., Ltd.) having a thickness of 0.5 mm was used.

After the reinforcing member 1 and the heat resistant member 2 were superposed one on top of the other, the superposed assembly was convoluted such that the heat resistant member 2 was located on the inner periphery and also on the outermost periphery, thereby preparing the cylindrical member 3.

The heat resistant member (expanded graphite) 4 similar to the heat resistant member 2 was prepared separately. An aqueous dispersion (25.5 wt. % of boron nitride, 4.5 wt. % of alumina, and 70 wt. % of water) containing as a solid content 30 wt. % of a lubricating composition containing 85 wt. % of boron nitride powder with an average particle size of 7 μm and 15 wt. % of alumina powder with an average particle size of 0.6 μm, was applied to one surface of the heat resistant member 4 by means of brushing, and was then dried. This coating operation was repeated three times to form the coating layer 5 of the lubricating composition.

The belt-shaped metal wire net 6, which was fabricated by forming a cylindrical metal wire net similar to the afore-mentioned reinforcing member 1 and by passing between a pair of rollers, was prepared. Then, the heat resistant member 4 having the coating layer 5 was inserted into the belt-shaped metal wire net 6, and an assembly thereof was passed between a pair of rollers so as to be formed integrally, thereby preparing the sliding surface member 7 on one surface of which the lubricating composition and the metal wire net were present in mixed form.

This sliding surface member 7 was wound around an outer peripheral surface of the aforementioned cylindrical member 3 in a state in which the surface of the sliding surface member 7 where the lubricating composition and the metal wire net were present in mixed form was placed on the outer side, thereby preparing the cylindrical preform 8.

The die 9 was prepared which had the cylindrical inner wall surface 91, the partially concave spherical inner wall surface 92 continuing from the cylindrical inner wall surface 91, and the through hole 93 continuing from the partially concave spherical inner wall surface 92, and in which the hollow cylindrical portion 95 and the spherical annular hollow portion 96 continuing from the hollow cylindrical portion 95 were formed inside it as the stepped core 94 was inserted in the through hole 93. Then, the cylindrical preform 8 was fitted over the stepped core 94 of the die 9 and was placed in the hollow portion of the die 9.

The cylindrical preform 8 located in the hollow portion of the die 9 is subjected to compression forming under a pressure of 3 tons/cm$^2$ in the direction of the core axis. Thus, the spherical annular seal 10 having the through hole 11 in its center and the partially convex spherical surface portion 12 on its outer surface was prepared.

By means of this compression forming, the reinforcing member and the heat resistant member in the cylindrical member of the cylindrical preform 8 were intertwined with each other and formed an integrated base of the seal. On the outer surface of the cylindrical preform 8, the sliding surface member was formed integrally, and a lubricating sliding layer was formed such that the lubricating composition of the sliding surface member was spread and was mixed with the reinforcing material of the sliding surface member.

EXAMPLE II

A cylindrical member similar to that of the above-described Example I was prepared. As the heat resistant member, expanded graphite was prepared separately. An aqueous dispersion (17 wt. % of boron nitride, 3 wt. % of alumina, 10 wt. % of polytetrafluoroethylene, and 70 wt. % of water) containing as a solid content 30 wt. % of a lubricating composition (56.7 wt. % of boron nitride, 10 wt. % of alumina, and 33.3 wt. % of polytetrafluoroethylene) in which a lubricating composition containing 85 wt. % of boron nitride powder with an average particle size of 7 μm and 15 wt. % of alumina powder with an average particle size of 0.6 μm was set as 100 parts by weight, and which additionally contained 50 parts by weight of polytetrafluoroethylene powder with an average particle size of 0.3 μm, was applied to one surface of the heat resistant member by means of brushing, and was then dried. This coating operation was repeated three times to form the coating layer of the lubricating composition. Thereafter, the same method as that of Example 1 was used to prepare the spherical annular seal.

EXAMPLE III

A cylindrical member similar to that of the above-described Example I was prepared. As the heat resistant member, expanded graphite was prepared separately. An aqueous dispersion (10.2 wt. % of boron nitride, 1.8 wt. % of alumina, 18 wt. % of polytetrafluoroethylene, and 70 wt. % of water) containing as a solid content 30 wt. % of a lubricating composition (34 wt. % of boron nitride, 6 wt. % of alumina, and 60 wt. % of polytetrafluoroethylene) in which a lubricating composition containing 85 wt. % of boron nitride powder with an average particle size of 7 μm and 15 wt. % of alumina powder with an average particle size of 0.6 μm was set as 100 parts by weight, and which additionally contained 150 parts by weight of polytetrafluoroethylene powder with an average particle size of 0.3 μm, was applied to one surface of the heat resistant member by means of brushing, and was then dried. This coating operation was repeated three times to form the coating layer of the lubricating composition. Thereafter, the same method as that of Example 1 was used to prepare the spherical annular seal.

COMPARATIVE EXAMPLE

A cylindrical member similar to that of the above-described Example I was prepared. As the heat resistant member, expanded graphite was prepared separately. An aqueous dispersion (30 wt. % of polytetrafluoroethylene and 70 wt. % of water) containing as a solid content 30 wt. % of polytetrafluoroethylene powder with an average particle size of 0.3 μm was applied to one surface of the heat resistant member by means of brushing, and was then dried. This coating operation was repeated three times to form the coating layer of the lubricating composition, and was used as the sliding surface member.

This sliding surface member was wound around the outer peripheral surface of the cylindrical member in a state in which the surface of the sliding surface member where the coating layer of the lubricating composition was formed was placed on the outer side, thereby preparing the cylindrical preform. Thereafter, the same method as that of Example 1 was used to prepare the spherical annular seal.

Then, with respect to the spherical annular seals in accordance with the above-described Examples and Comparative Example, tests were conducted for measurement of a frictional torque (kgf·cm) during an initial period of wear of the seals and for checking the presence or absence of the occurrence of abnormal noise by using the exhaust pipe joint shown in FIG. 8, and its results are discussed below.

Test I

Test Conditions:

Pressing force using coil springs: 72 kgf

Angle of oscillation: ±3°

Frequency: 12 hertz

Ambient temperature (temperature of the outer surface temperature of the concave spherical surface portion 302 shown in FIG. 8): from room temperature (20° C.) to 300° C.

Test II

Test Conditions:

Pressing force using coil springs: 72 kgf

Angle of oscillation: ±3°

Frequency: 12 hertz

Ambient temperature (same as above): from room temperature (20° C.) to 500° C.

Test Method (both Tests I and II): An oscillating motion at ±3° at a frequency of 12 hertz is set as a unit of oscillation, and is performed 45,000 times at room temperature. The ambient temperature is then raised to 300° C. (Test I) or 500° C. (Test II) while continuing the oscillating motion (the number of oscillating motions during the temperature rise being 45,000). When the ambient temperature reaches 300° C. and 500° C., the oscillating motion is performed 115,000 times. Finally, the temperature is allowed to drop to room temperature while continuing the oscillating motion (the number of oscillating motions during the temperature drop being 45,000). The total number of oscillating motions of 250,000 is set as one cycle, and four cycles are performed.

In addition, the evaluation of the presence or absence of the occurrence of abnormal noise is conducted as follows.

Evaluation Code I: No abnormal noise occurred.

Evaluation Code II: Abnormal noise is heard slightly with the ear brought close to the test piece.

Evaluation Code III: Although the noise is generally difficult to discern at a fixed position (a position 1.5 m distant from the test piece) since it is blanketed by the noises of the living environment, the noise can be discerned as abnormal noise by a person in charge of the test.

Evaluation Code IV: The noise can be recognized as abnormal noise (unpleasant sound) by anybody at the fixed position.

Table 1 shows the results of Test I obtained by the above-described test method, and Table 2 shows the results of Test II obtained by the above-described test method.

In Tables 1 and 2, item 1 represents the results with the number of oscillating motions of 0 to 250,000; item 2 represents the results with the number of oscillating motions of 250,000 to 500,000; item 3 represents the results with the number of oscillating motions of 500,000 to 750,000; and item 4 represents the results with the number of oscillating motions of 750,000 to 1,000,000.

TABLE 1

|   |                   | Example I | Example II | Example III | Comparative Example |
|---|-------------------|-----------|------------|-------------|---------------------|
| 1 | Frictional torque | 90–110    | 70–100     | 60–90       | 60–90               |
|   | Abnormal noise    | I         | I          | I           | I                   |
| 2 | Frictional torque | 110–130   | 90–110     | 90–100      | 90–100              |
|   | Abnormal noise    | I         | I          | I           | I                   |
| 3 | Frictional torque | 130       | 120        | 110         | 110                 |
|   | Abnormal noise    | I         | I          | I           | I                   |
| 4 | Frictional torque | 130       | 120        | 110         | 110                 |
|   | Abnormal noise    | I         | I          | I           | I                   |

TABLE 2

|   |                   | Example I | Example II | Example III | Comparative Example |
|---|-------------------|-----------|------------|-------------|---------------------|
| 1 | Frictional torque | 70–100    | 60–90      | 50–90       | 80–130              |
|   | Abnormal noise    | I         | I          | I           | I                   |
| 2 | Frictional        | 90–100    | 90–100     | 80–100      | 120–130             |

TABLE 2-continued

|   |                    | Example I | Example II | Example III | Comparative Example |
|---|--------------------|-----------|------------|-------------|---------------------|
|   | torque             |           |            |             |                     |
|   | Abnormal noise     | I         | I          | I           | IV                  |
| 3 | Frictional torque  | 110       | 100        | 80–100      | 130–160             |
|   | Abnormal noise     | I         | I          | I           | IV                  |
| 4 | Frictional torque  | 120       | 110        | 80–100      | 130–160             |
|   | Abnormal noise     | I         | I          | I           | IV                  |

From the results of Test I, no difference in performance is recognized between the Example and the Comparative Example, the frictional torque is low in both cases, and no occurrence of abnormal noise is recognized.

Meanwhile, from the results of Test II, the occurrence of abnormal noise is recognized in the case of the spherical annular seal of the Comparative Example with a rise in the ambient temperature. This is presumably attributable to the fact that, when the ambient temperature exceeds 300° C., the lubricating sliding layer at the surface becomes fused and soft, the lubricating sliding layer flows out from the surface due to the oscillating motion which is continued in that state, and the friction between the seal and the mating member shifted from friction between the lubricating sliding layer and the mating member to friction between the heat resistant member (expanded graphite) and the mating member, resulting in the occurrence of the abnormal noise.

On the other hand, with the spherical annular seals in accordance with the Examples, even when the ambient temperature reaches 500° C., the phenomenon of fusion and softening does not occur in the lubricating sliding layer at the surface, the lubricating sliding layer is retained at the seal surface, and stable oscillating motions are repeated at a low frictional torque without any occurrence of abnormal noise due to friction between the lubricating sliding layer and the mating member.

The fact that the above-described test results are obtained although polytetrafluoroethylene is compounded in the lubricating sliding layers in the Examples II and III is conceivably attributable to the following reasons, among others: The fusing and softening temperature of polytetrafluoroethylene is apparently increased by boron nitride and alumina contained in the lubricating composition; continuous and direct friction between the lubricating sliding layer and the mating member is prevented since the reinforcing material formed of a metal wire net and the lubricating sliding layer are present in mixed form on the surface of the partially convex spherical surface portion which forms a frictional surface with respect to the mating member; and the retainability of the lubricating sliding layer on the partially convex spherical surface is enhanced by the action of alumina.

Next, a description will be given of the results of a test conducted concerning a phenomenon in which the lubricating sliding layer formed on the surface of the spherical annular seal adheres fixedly to the mating member.

Test III

Test Conditions:

Pressing force using coil springs: 72 kgf

Ambient temperature (temperature of the outer surface temperature of the concave spherical surface portion 302 shown in FIG. 8): from room temperature (20° C.) to 400° C.

Test Method: The spherical annular seals in accordance with the Examples and the Comparative Example were incorporated in the exhaust pipe joint shown in FIG. 8. The ambient temperature was raised from room temperature until it reached 400° C., at which temperature the ambient temperature was held for 10 minutes, and the ambient temperature was allowed to drop to room temperature. Then, a starting frictional torque is measured, and the occurrence of abnormal noise is examined.

Table 3 shows the results of the test obtained by the above-described test method.

TABLE 3

|                   | Example I | Example II | Example III | Comparative Example |
|-------------------|-----------|------------|-------------|---------------------|
| Frictional torque | 130       | 160        | 200         | 500 or more         |
| Abnormal noise    | I         | I          | I           | —                   |

From the results of the test, in the case of the spherical annular seal in accordance with the Comparative Example, the lubricating sliding layer of the lubricating composition containing polytetrafluoroethylene and formed on the surface of the partially convex spherical surface portion firmly adhered to the mating member (concave spherical surface portion), and the starting frictional torque was very high at 500 kgf·cm or more, inhibiting relative angular displacements of the upstream- and downstream-side exhaust pipes.

On the other hand, the spherical annular seals in accordance with the Examples did not fixedly adhere to the surface of the mating member, no abnormal noise occurred, and the starting frictional torque was low, allowing relative angular displacements of the upstream- and downstream-side exhaust pipes.

The occurrence of such the above-described differences between the spherical annular seals in accordance with the Examples and the Comparative Example are attributable to the following reasons.

In the case of the spherical annular seal in accordance with the Comparative Example, the lubricating sliding layer of the lubricating composition containing polytetrafluoroethylene undergoes fusion and softening due to a rise in the ambient temperature, and the pressing forces of the coil springs act as powerful tightening forces between the spherical annular seal and the concave spherical surface portion of the exhaust pipe in this fused and softened state. As the spherical annular seal is cooled in this state, fixed adhesion presumably occurs between the lubricating sliding layer and the concave spherical surface portion of the exhaust pipe.

On the other hand, in the case of the spherical annular seal in accordance with the Examples, as described above, the lubricating sliding layer is formed of a lubricating composition containing boron nitride and alumina, or a lubricating composition containing boron nitride, alumina, and polytetrafluoroethylene. In particular, as for the seals in accordance with the Examples II and III, it can be conjectured that the phenomenon as in the case of the Comparative Example does not occur for the following reasons: The fusing and softening temperature of polytetrafluoroethylene is apparently increased by boron nitride and alumina contained in the lubricating composition; continuous and direct friction between the lubricating sliding layer and the mating member is prevented since the reinforcing material formed of a metal wire net and the lubricating sliding layer are present in mixed form on the surface of the partially convex spherical surface portion which forms a frictional surface with respect to the mating member; and the retainability of the lubricating sliding layer on the partially convex spherical surface is enhanced by the action of alumina.

From the above-described test results, it can be appreciated that the spherical annular seals in accordance with the Examples allow relative angular displacements of the upstream- and downstream-side exhaust pipes at a low frictional torque without occurrence of abnormal noise irrespective of a rise in the ambient temperature and the relative magnitude of the angle of oscillation. With the spherical annular seal in accordance with the Comparative Example, however, the above-described problems occur when it is applied to a portion where the angle of oscillation is small, so that its conditions of use and portions where it is used are naturally restricted.

Although examples in which alumina is used have been shown in the above-described embodiment, silica may be used instead of alumina, or both alumina and silica may be used, in which cases it is possible to obtain advantages similar to those obtained in the case where alumina is used.

What is claimed is:

1. A spherical annular seal for use with an exhaust pipe joint, comprising:

an annular base portion including a compressed reinforcing material and a compressed heat-resistant material, said reinforcing material being made of a fine metal wire net, said heat-resistant member being made of material selected from the group consisting of expanded graphite, mica and asbestos; and an annular outer portion provided unitarily on said base portion and having a partially convex spherical outer surface which is formed smoothly, said outer portion having a lubricating sliding layer, an exposed outer surface of said layer being made of a lubricating composition which is a mixture of 70 to 90 wt. % of boron nitride and 10 to 30 wt. % of material selected from the group consisting of alumina, silica, and mixtures thereof;

said outer surface of said lubricating sliding layer being covered partially with a reinforcing material made of a compressed fine metal wire net which is embedded mixedly unitarily in said sliding layer, said exposed outer surface of the lubricating sliding layer defining said partially convex spherical outer surface.

2. The spherical annular seal according to claim 1, wherein said lubricating composition contains 100 parts by weight of the lubricating composition containing 70 to 90 wt. % of boron nitride and 10 to 30 wt. % of material selected from the group consisting of alumina, silica, and mixtures thereof, and further contains polytetrafluoroethylene in a proportion of not more than 200 parts by weight.

3. The spherical annular seal according to claim 1, wherein said lubricating composition contains 100 parts by weight of the lubricating composition containing 70 to 90 wt. % of boron nitride and 10 to 30 wt. % of material selected from the group consisting of alumina, silica, and mixtures thereof, and further contains polytetrafluoroethylene in a proportion ranging from 50 to 150 parts by weight.

4. The spherical annular seal according to claim 1, wherein said wire net of the base portion is a woven net.

5. The spherical annular seal according to claim 1, wherein said wire net of the base portion is a knitted net.

* * * * *